United States Patent
Baina et al.

(10) Patent No.: US 7,107,251 B1
(45) Date of Patent: Sep. 12, 2006

(54) METHOD OF EVALUATING THE QUALITY OF AUDIO-VISUAL SEQUENCES

(75) Inventors: Jamal Baina, Nancy (FR); Pierre Bretillon, Metz (FR)

(73) Assignee: Tediffusion de France, Paris (FR)

( * ) Notice: Subject to any disclaimer, the term of this patent is extended or adjusted under 35 U.S.C. 154(b) by 641 days.

(21) Appl. No.: 10/018,661

(22) PCT Filed: Jun. 15, 2000

(86) PCT No.: PCT/FR00/01659

§ 371 (c)(1),
(2), (4) Date: Jun. 18, 2002

(87) PCT Pub. No.: WO01/01705

PCT Pub. Date: Jan. 14, 2001

(30) Foreign Application Priority Data

Jun. 23, 1999 (FR) .................................. 99 08008

(51) Int. Cl.
*G06F 15/18* (2006.01)
(52) U.S. Cl. ...................................... 706/12
(58) Field of Classification Search ................ 706/12; 382/159, 160, 253
See application file for complete search history.

(56) References Cited

OTHER PUBLICATIONS

Quincy et al. "Expert Pattern Recognition Method and for Technology-Independent Classification of Video," IEEE, 1988.*
Quincy et al. "Speech Quality Assessment Using Expert Pattern Recognition Techniques," IEEE, 1989.*
Expert Pattern Recognition Method for Technology-Independent Classification of Video Transmission Quality, Edmund A. Quincy, et al., Globecom '88, IEEE Global Telecommunications Conference and Exhibition, Hollywood, USA, Nov. 28-Dec. 1, 1988, pp. 1304-1308.
The Development and Correlation of Objective and Subjective Vido Quality Measures, Stephen D. Voran et al., IEEE Pacific Rim Conference on Communications, Computers and Signal Processing, May 9-10, 1991, pp. 483-485.

\* cited by examiner

*Primary Examiner*—Anthony Knight
*Assistant Examiner*—Michael B. Holmes
(74) *Attorney, Agent, or Firm*—Clark & Brody

(57) ABSTRACT

The invention provides a method of evaluating the quality of an audiovisual sequence by:

a) training, comprising allocating a subjective score $NS_i$ to each of $N_0$ training sequences $S_i$ (where i=1, 2, ..., $N_0$) presenting degradations identified by a training vector $MO_1$ which is given to each sequence $S_i$ in application of a first vectorizing method, in order to build up a database of $N_0$ training vectors $MO_i$ with subjective scores $NS_1$;

b) classifying the $N_0$ training vectors $MO_i$ into $k$ classes of scores as a function of the subjective scores $NS_1$ that have been allocated to them, so as to form $k$ training sets $EA$ (where j=1, 2, ..., k) which have $k$ significant training scores $NSR_j$ allocated thereto;

c) for each audiovisual sequence to be evaluated, generating a vector MO using said first vectorization method; and d) allocating to the audiovisual sequence for evaluation the significant training score $NSR_j$ that corresponds to the closest training set $EA_j$.

6 Claims, 4 Drawing Sheets

METHOD OF EVALUATING THE QUALITY OF AUDIO-VISUAL SEQUENCES

The present invention relates to a method of evaluating the quality of an audiovisual sequence, such a sequence being defined in its most general form as comprising audio and/or video signals.

BACKGROUND OF THE INVENTION

The ability to digitize audio and video signals opens up the possibility of being able to copy, store, or transmit this type of information while maintaining constant quality. However, the large quantity of information conveyed by audiovisual signals makes it necessary in practice to use digital compression methods in order to reduce the bit rate.

The Motion Picture Experts Group standard MPEG2 describes techniques of a certain type that are applicable to reducing bit rate. Those algorithms are said to be "with loss", since the signals played back after decoding are no longer identical to the original signals. In order to maintain acceptable quality for the final viewer, algorithms for reducing bit rate take advantage of perceptual properties of human eyes and ears. In spite of this, signal content and the constraints imposed on bit rate or bandwidth available for transmission mean that characteristic degradation appears in the signal after decoding. Such degradation introduced by the global MPEG2 system for encoding and transmission has a direct influence on quality as finally perceived.

Automatic evaluation of the quality of audiovisual signals has a wide range of applications in digital television: production, distribution, and performance evaluation of systems.

Unfortunately, existing apparatuses are designed for laboratory tests and are unsuited for remote surveillance of distribution networks.

There are two different ways of qualifying the degradations that affect picture and sound quality during application of encoding to reduce bit rate or during transmission. Firstly, subjective tests conducted under precise conditions provide results that are reproducible. However such tests are lengthy and expensive to perform. Secondly, automatic systems for evaluating quality on the basis of objective measurements make it possible, for example, to facilitate the development of encoding algorithms and the making of comparisons between them. Such systems make it possible to test digital systems on a spot basis or continuously. In order to obtain objective measurements that are significantly correlated with subjective values, the properties of the human visual system must first be taken into account.

The notion of quality is essentially relative. Even a viewer placed under ordinary conditions of observation (at home) judges the quality of signals made available by comparison with a reference. Under such circumstances, the reference is constituted by the viewer's expectations or habits. Similarly, a method of objectively evaluating quality analyzes degradations introduced by the system on the signals by taking account of reference signals that are present at the input to the system. The study of objective metrics thus requires firstly analysis of defects introduced in the signals, and secondly analysis of the human perceptual system and its properties. The various approaches are based either on computing an error signal, or on identifying signatures that are specific to artifacts introduced by the audiovisual system. The application of perception models makes it possible to evaluate the importance of degradations for the human perceptual system HPS.

Subjective tests are the result of submitting audiovisual signals to a panel of observers representative of the population. A set of satisfaction tests is performed under controlled viewing and listening conditions. The signals are presented to the observers under a predefined protocol to enable the observers to respond to final quality. Quality is graded using a predefined scale. Quality evaluation scores are obtained after presenting audio, video, or simultaneous audio and video sequences. Statistical computations serve to refine the individual scores by filtering them and homogenizing them. Various subjective test methodologies have been standardized, in particular in the International Telecommunications Union Recommendation ITU-R Bt.500 entitled "Method for the subjective assessment of the quality of television pictures". Two such methodologies using a continuous scoring scale are;

DSCQS: "double stimulus continuous quality scale" protocol; and

SSCQE: "single stimulus continuous quality evaluation" protocol.

The first method serves to obtain a score for a 10-second video sequence. Two sequences A and A' are presented in succession corresponding respectively to the original and to the degraded sequence (cf. FIG. 1).

The second method omits reference signals and evaluates a given sequence in intrinsic manner. FIG. 2 shows a curve of subjective scores achieved during a 30-minute long sequence. The abscissa axis represents time. A subjective score sample was taken every N seconds. The ordinate represents the quality grading scale. The curve shows the impact on subjective quality of all of the disturbances to which the sequence was subject.

Objective measurements can be performed using various approaches.

The principle of the approach which uses perception models is to stimulate the behavior of the human perceptual system (HPS) in part or in full. Given that in this context it is the quality of audiovisual signals that is to be determined, it suffices to evaluate the perceivability of errors. By modeling certain functions of the HPS, it is possible to quantify the impact of errors on the sense organs of humans. These models act like weighting functions applied to the error signals. In this way, the effect of each degradation is modulated in proportion. The overall process makes it possible objectively to evaluate the quality of signals passing through an audiovisual system (see FIG. 3).

Reference signals $S_{ref}$, e.g. representing an audiovisual sequence, and signals $S_0$ from said sequence and degraded by an audiovisual system SA are compared in a module MID for identifying defects, and then a score NT is given to the defects by comparison with a model MOD.

In the context of computing an error signal, signal-to-noise ratio can be considered as a quality factor. However it is found in practice that it is poorly representative of subjective quality. This parameter is very general, and thus incapable of spotting local degradations, of the kind that are typical in digital systems. Furthermore, signal-to-noise ratio makes it possible to evaluate the fidelity of degraded signals compared with the original very strictly, but that is different from evaluating the overall perceived quality.

To obtain a better evaluation of quality, it is necessary to use a large amount of experimental data concerning the human perceptual system. Application of the data is greatly facilitated since the system has been studied in terms of its sensitivity to a stimulus (in this case the error) in the context of a picture, for example. In this context, what matters is the response of the human visual system (HVS) to a contrast and not to an absolute magnitude such as luminance.

Various test images, such as uniform areas of luminance, or frequencies in space or time, have made it possible experimentally to determine the sensitivity of the visual system and the associated values of just-perceivable contrast. The appearance of the HVS response to light intensity is logarithmic, with optimum sensitivity being at spatial frequencies close to 5 cycles/degree. Nevertheless, those results need to be applied with prudence, since they are visibility threshold values. This explains why it is difficult to predict the importance of degradations of large amplitude.

Hearing models proceed in similar manner. Experimentally, the sensitivity to various stimuli is measured. It is then applied to various signal errors in order to evaluate quality.

However, audiovisual signals are complex in terms of richness of information. Furthermore, in practice, the use of that type of model to evaluate audiovisual signals raises several problems. In addition to the fact that the reference and degraded signals need to be available physically at the same location, it is also essential for sequences to be caused to correspond exactly in space and in time. That approach is therefore applicable to evaluating equipment such as an encoder when all of the equipment is located in a single laboratory, or to some cases of evaluating transmission such as satellite transmission where the transmitter and the receiver can both be on the same premises.

The approach which makes use of parametric models combines a series of parameters or degradation indicators chosen for generating an overall objective score.

The objective measurements applied to the audio and/or video signals are indicators of signal content and of the degradations to which they have been subjected. The relevance of these parameters depends on how representative they are in terms of sensitivity to defects.

Two categories of approach are then possible when generating parameters:

1) category I: "with a priori knowledge of the reference signal"; and
2) category II: "without a priori knowledge of the reference signal".

The first approach category I relies on performing the same transformation or the same parameter computation on the reference signal and on the degraded signal. Generating an overall quality score relies on comparing results coming from both treatments. The measured difference represents the degradation to which the signal has been subjected.

The second approach category II does not require knowledge about the original signal, but only knowledge about the characteristics which are specific to degradation. It is then possible to compute one indicator for one or more degradation types. Low bit rate encoding and disturbed broadcasting of digital television signals generate identifiable characteristic defects: the blocking effect, picture freezing, etc. Factors for detecting these defects can be generated and used as quality indicators.

An example of a parametric model:

Numerous parameters have been proposed in the literature for implementing parametric models. The present invention does not seek to define new parameters, but to propose a general model for making use of such measurements.

The approach consists in comparing two images (the reference image and the degraded image) only on the basis of parameters that are characteristic of their content. Which parameters are selected is associated with their sensitivity to certain degradations which the system under evaluation produces. Thereafter, a quality measurement is built up by correlation using a series of objective measurements.

As an example, we mention a technique developed by the US Institute of Telecommunication Sciences (ITS). It relies on extracting a space parameter SI and a time parameter TI characteristic of sequence content (see FIG. 4). For further information, reference can be made to an article by A. A. Webster et al. entitled "An objective video quality assessment system based on human perception", published in SPIE, Vol. 1913, pp. 15–26, June 1993.

The space information that is considered as being important in this case is outline information. For an image I at time t, the space parameter SI is obtained from the standard deviation of the image as filtered by Sobel gradients. This technique reveals the outlines of the image under analysis, and these play an important part in vision:

$$SI_t = \sigma_{x,y}(\text{Sobel}[I_t(x, y)])$$

In analogous manner, time information at a given instant is defined by the standard deviation of the difference between two consecutive images:

$$TI_t = \sigma_{x,y}(I_t(x,y) - I_{t-1}(x, y))$$

A measurement based on those two pieces of information makes it possible to evaluate change in content between the input of a video system ($S_{ref}$) and its output ($S_s$), by using various comparisons.

$$M_1 = \log_{10}\left[\frac{TI_s(t)}{TI_{ref}(t)}\right]$$

$$M_2 = \left[\frac{ST_{ref}(t) - ST_s(t)}{SI_{ref}(t)}\right]$$

$$M_3 = [TI_s(t) - TI_{ref}(t)]$$

The three parameters $M_1$, $M_2$, and $M_3$ are taken from these comparisons by a comparator COMP. Each of them is sensitive to one or more degradations. Thus, by comparing parameters SI, loss of focus (reduction in SI) is taken into account as are the outlines that are artificially introduced by the blocking effect (increase in SI). Similarly, differences between two versions of TI reveal defects in the encoding of motion.

The following step consists in summing $M_1$, $M_2$, $M_3$ over time using one of the Minkowski norms Lp (in general, p=1, 2, or ∞). In this manner, it is possible to construct a summing model. That makes it possible to produce a quality score at the outlet from a summing module SMOD. The chosen model is a linear combination of the terms in $M_i$:

$$Q = \alpha + \beta M_1 + \gamma M_2 + \mu M_3$$

The weighting coefficients ($\alpha$, $\beta$, $\gamma$, $\mu$) are computed by an iterative procedure MIN for minimizing distortion between the objectives scores Q and the subjective scores obtained on the same batch of pictures. The idea is to use iteration to discover the parameters of the combinatory model. In this manner, the estimated objective measurement will come as close to possible to the subjective score. The performance index of the model is given by the correlation coefficient.

An example of a model has been proposed in the literature. It makes it possible to obtain a good correlation coefficient: 0.92.

$$Q = 4.77 - 0.992 M_1 - 0.272 M_2 - 0.356 M_3$$

Nevertheless, it appears that combinatory models produce performance that is not so good when they are used with pictures other than those appearing in the batch which was used for devising the model.

This approach is less constricting to implement than the preceding approach. Nevertheless, in practice, it remains difficult to achieve space and time correspondence between the scores of the two signal sequences.

OBJECTS AND SUMMARY OF THE INVENTION

An object of the invention is to provide a method which makes it possible to achieve good correspondence between objective measurements and subjective scores given by a panel of spectators.

Another object of the invention is to provide a method enabling an audiovisual sequence to be evaluated in absolute manner, i.e. without having access to a non-degraded original sequence.

Another object of the invention is to provide a method making it simple and effective to evaluate the quality of audiovisual signals in a network for broadcasting audio and/or video signals.

At least one of the above-specified objects is achieved by a method of evaluating the quality of an audiovisual sequence, the method implementing:

a) training, comprising allocating a subjective score $NS_1$ to each of $N_0$ training sequences $S_i$ (where i=1, 2, ..., $N_0$) presenting degradations identified by a training vector $MO_1$ which is given to each sequence $S_1$ in application of a first vectorizing method, in order to build up a database of $N_0$ training vectors $MO_1$ with subjective scores $NS_i$;

b) classifying the $N_0$ training vectors $MO_1$ into $\underline{k}$ classes of scores as a function of the subjective scores $NS_i$ that have been allocated to them, so as to form $\underline{k}$ training sets $EA_j$ (where j=1, 2, ..., k) which have $\underline{k}$ significant training scores $NSR_j$ allocated thereto;

c) for each audiovisual sequence to be evaluated, generating a vector MO using said first vectorization method; and d) allocating to the audiovisual sequence for evaluation the significant training score $NSR_j$ that corresponds to the closest training set $EA_j$.

By way of example, this allocation can be performed by allocating to the sequence, the score which corresponds to the closest training vector.

Preferably, between step b) and c), the following step is performed:

b1) for each training set $EA_j$, using a second vectorization method to generate a reference dictionary $D_j$ made up of $N_j$ reference vectors $VR_1$ (where 1=1, 2, $N_j$);

and between steps c) and d):

c1) selecting amongst the reference vectors $VR_1$ of the $\underline{k}$ reference dictionaries, the reference vector $VR_e$ which is closest to said vector MO.

In which case, allocation is performed on the basis of the significant training score $NSR_j$ corresponding to the reference dictionary to which said closest reference vector $VR_e$ belongs.

The significant training scores $NSR_j$ can be distributed uniformly along a scoring scale, or better still they can be distributed in non-uniform manner, thus making it possible to make measurements more meaningful, e.g. because at least some of the reference dictionaries can then contain substantially the same numbers of reference vectors.

In a preferred implementation, the significant training scores $NSR_j$ are distributed by a training technique.

The method then comprises, between steps a) and b), identifying $\underline{k}$ significant training scores NSR, from subjective scores $NS_1$ each considered as a one-dimensional vector, by finding the minimum distance between the set of the $N_0$ subjective scores $NS_i$ and the $\underline{k}$ significant training scores.

BRIEF DESCRIPTION OF THE DRAWINGS

Other characteristics and advantages of the invention appear better from the following description and the drawings accompanying it, in which.

MORE DETAILED DESCRIPTION

Figure 1:
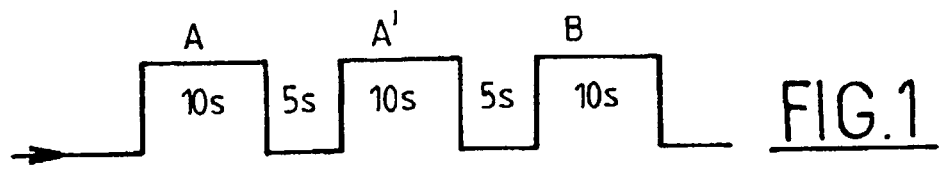
FIG. 1 and FIG. 2 show two prior art evaluation methods known respectively as DSCQS and SSCQE.
Figure 2:
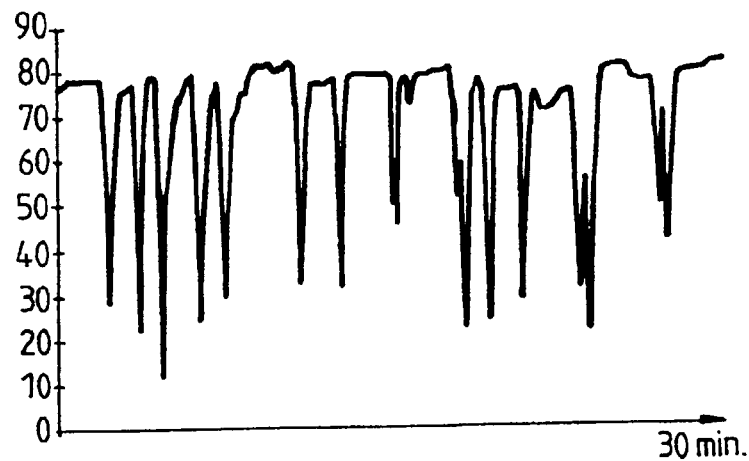
Figure 3:
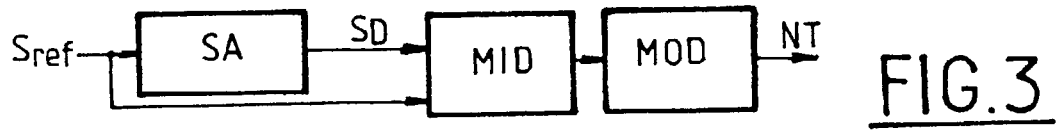
FIG. 3 shows a known approach implementing perception models.
Figure 4:
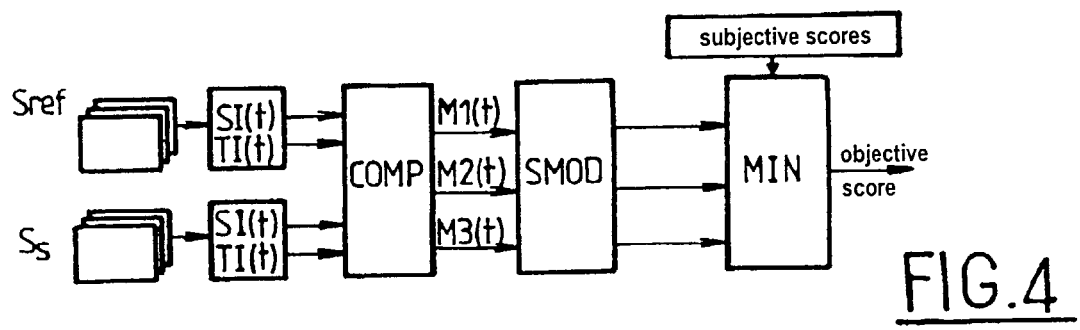
FIG. 4 shows a method developed by ITS.

The invention is presented as an objective method of evaluating the quality of audio and video signals based on a set of parameters.

The method does not require new parameters to be defined. It is based on the idea of proposing a general model based on vector quantification to make use of the measurements. It is a training approach making it possible to give objective quality scores to audiovisual signals. This evaluation is performed in a manner which is correlated with subjective scoring with the help of an objective perception model. To do this, the model operates in two stages.

The first stage is performed on a set of training audiovisual sequences. The model establishes correspondence between two databases derived from the same audiovisual signals:

a subjective score database (BDSN); and a database of objective measurements taken from the audio and video signals (BDMO);

in order to associate a subjective score with a set of degradation indicators (forming a vector of objective measurements).

This stage derives knowledge that is pertinent in qualifying signal quality.

During the second stage, which corresponds to operational use of the method, the method makes use of its knowledge. Each time it is necessary to qualify the quality of an audiovisual sequence, the model extracts parameters representative of degradations. Thereafter, it applies the result of its computations to its knowledge base. This operation makes it possible to give an objective score that is very close to the subjective score which a representative panel would have given. The process used in the present invention makes use of vector quantification. The principle is to search through dictionaries of vectors to find the representative vector that is closest to the parameter vector computed on the audio and video signals. By way of example, the subjective score that is generated can be the score which is associated with the dictionary containing the closest representative vector.

The problems associated with vector quantification have been identified in the literature. They can be summarized by defining its three main interdependent components:

forming vectors from the information to be encoded;

forming the dictionary from a training set; and determining the closest neighbor using an appropriate distance.

The notion of distance or distortion between two vectors is introduced for finding the closest neighbor in the dictionary. Several distances have been proposed for optimizing vector quantification and for achieving maximum fidelity with the initial signals.

The distance or distortion known as quadratic error is one of the most widely used for vector quantification. The term "distance" is not exact in this case, since mathematically speaking the term constitutes the square of a distance.

$$D(A, B) = \sum_{j=1}^{t} (A_j - B_j)^2$$

where (A, B) are two vectors of dimension t.

Vector quantification is used in the present invention for generating an objective perception model. The model is then used for quantifying the quality of audiovisual signals.

Let there be a set E of $N_0$ audio sequences $S_i$ of n seconds each. They are all made up of a series of video pictures and of audio samples.

$E=\{S_i/i= \ldots N_0\}$

These sequences pass through configurations that are representative of digital television distribution systems. The broadcast and distribution networks used are by satellite, by cable, and by terrestrial network. Disturbances arise during transmission of audiovisual signals and degrade them.

We have performed subjective tests on the above set of degraded sequences. A database of subjective scores has been built.

$BDES=\{NS_i/i=1 \ldots N_0\}$

Where $NS_i$ represents the subjective score obtained by sequence $S_i$ in set E.

Furthermore, we have built another database on the basis of objective measurements $MO_i$ performed on the set of sequences E.

$BDMO=\{LO_i/i=1 \ldots N_0\}$ with:

$MO_i=(V_i, \ldots, V_t)$

Figure 5:
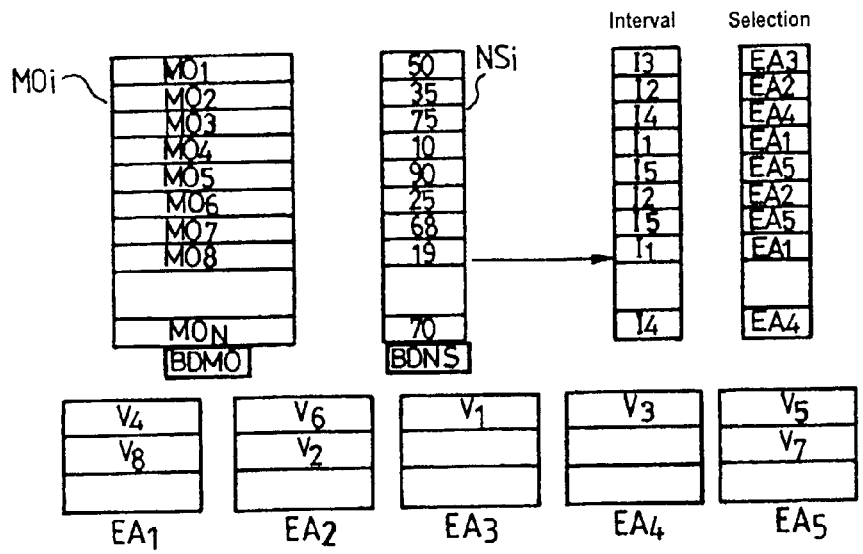
FIG. 5 shows a preferred implementation of the invention.

Each sequence $S_1$ corresponds to a vector $MO_i$ (see FIG. 5). These vectors comprise $t$ parameters $V_j$ computed from the audio and/or video signals. These parameters can be comparative (category I) or intrinsic (category II). They provide information concerning content and the degradations to which the sequence has been subjected.

In order to form the representative vector $MO_i$ for each audiovisual sequence $S_i$, a distinct method computes objective parameters that are extracted from samples of the digital audio and video signals.

Using the data as described above, the method begins with a training stage. Appropriate processing of the data serves to develop a knowledge base which is subsequently used by the model during the operational stage.

The set E of sequences $S_1$ is subdivided into $\underline{k}$ classes of scores $EA_j$. To do this, use is made of the value of the subjective score $NS_1$ allocated to the sequence $S_i$. The variation interval of $NS_i$ is thus subdivided into $\underline{k}$ distinct segments $I_j$ which are associated with the $\underline{k}$ training sets $EA_j$. A representative subjective score $NSR_j$ is associated with each segment $j$. This operation groups data concerning sequences of quality that is judged to be similar or equivalent into each class having a score $EA_j$.

The value $\underline{k}$ (e.g. k=5) is taken as an example application in FIG. 5. It is possible to envisage distribution over a number of classes that is larger or smaller as a function of the accuracy requirements of the measuring equipment.

The vectors $MO_i$ of objective measurements of the sequences $S_i$ corresponding to a range $I_j$ of subjective score values $NS_1$ are collected together in training set $EA_j$. $\underline{k}$ training sets are then formed on the basis of the initial data (cf. FIG. 5).

Starting from a training set having M vectors, the reference dictionary which is made up of N vectors is the dictionary which best represents the initial set of vectors. It uses a group of vectors presenting the smallest mean distance or distortion relative to all of the M vectors in the training set, compared with the other possible candidate dictionaries. Dictionary building is based on forming the best representative vectors.

Classification algorithms are used so as to build a dictionary of representative vectors from an initial set. This is referred to as the "training set".

Several authors have proposed solutions for classifying in dictionaries:

dynamic swarms or LBG algorithm;

Kohonen's neural network method.

Figure 6:
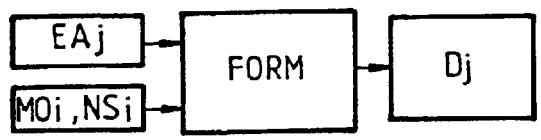
FIG. 6 shows how a dictionary $D_j$ is formed in accordance with the invention.

For each class of scores $EA_j$ and starting from objective measurement vector $MO_i$ together with their scores $NS_i$ (see FIG. 6), a procedure FORM is applied to build a dictionary $D_j$.

$\underline{k}$ dictionaries $D_j$, each made up of $N_j$ vectors are associated with the $\underline{k}$ classes or ranges of subjective scores. The value of $N_j$ is selected as a function of the initial number of vectors in score class $EA_j$ and depending on the accuracy required for the model. Each dictionary $D_j$ is thus associated with an interval $I_j$ of subjective scores.

The algorithms used for building dictionaries $D_j$ are LBG and Kohonen's neural networks. Those methods give comparable results. Those techniques are particularly effective even when the sizes $N_j$ of the dictionaries are deliberately chosen to be small (e.g. $N_j= \ldots$ ), and the reference dictionaries remain representative.

Figure 7:
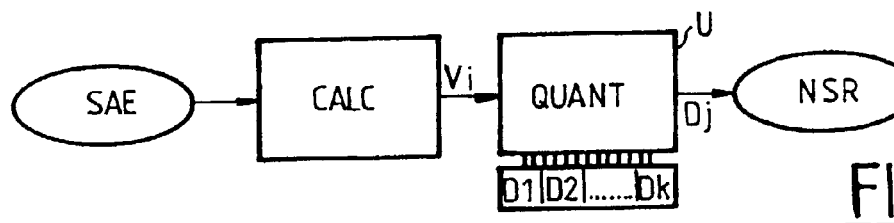
FIG. 7 shows the process for storing a sequence to be evaluated, in accordance with the invention.

The purpose of automatic apparatus for evaluating signal quality is to provide a final score evaluating said signal. During operational use, the method described by the present invention is performed using two processes (see FIG. 7).

The first process lies in treating the audio and/or video samples of the audiovisual sequence to evaluate SAE so as to extract the parameters therefrom. A vector $V_i$ of audio and/or video quality indicators is formed using categories I and/or II as described above. This serves to present characteristics that are pertinent for qualifying the signals.

The second process (QUANT) uses vector qualification on the vector $V_1$ of input parameters allocated to an audiovisual sequence for evaluation in order to establish a correspondence with the index j of the closest dictionary. For this purpose, the distortion between the incident vector and all of the vectors of the k dictionaries is minimized. That serves to identify the dictionary $D_j$ containing the vector U which is closest to the vector $V_i$, and thus to identify the index j.

The operation that it is advantageous to use in this approach is vector quantification. It makes it possible to find the closest neighbors of a vector $V_1$ and consequently its best representative in a dictionary or a set of dictionaries. For a given input vector $V_i$, vector quantification determines which vector of which dictionary is the closest thereto, and allocates the significant training score $NSR_j$ of said dictionary $D_j$ thereto.

The index j is no more than the quality class obtained by grading subjective tests performed on audiovisual sequences. With this technique of subdivision into a plurality of training sets, two important points need to be studied:

the size of each dictionary; and the positions of the score ranges for each dictionary.

The size of each dictionary is of considerable importance. The number of vectors has a direct influence on the representativeness of the dictionary, and consequently on the effectiveness of the vector quantification.

The positions of the score ranges are just as important. It is necessary to know which scores are going to be associated with one another. For example, a large range of scores can be set aside for bad quality, thus ensuring that once quality has dropped to a minimum, quantification will detect it. It is also possible, on the contrary, to retain a small range for bad quality, so that the quantifier will detect bad video quality only when it is strongly degraded.

It can thus be seen that using these two parameters it is possible to influence the way vector quantification occurred. It is also possible to influence this quantification by adding preprocessing on the objective parameters computed from the audio and/or video signals.

The operation of the method is described above as comprising three main steps: firstly objective measurements $MO_i$ are made, then dictionaries $D_j$ are built, and finally a search is made for the dictionary containing the vector which is closest to an objective measurement vector. The model can then allocate the representative subjective score $NSR_j$ associated with the dictionary $D_j$ to the sequence $S_i$ as represented by the objective measurements $MO_1$ by making use of its knowledge base. However, no method of selecting ranges in the subjective score scale has been defined, nor has any method been defined for selecting the representative score $NSR_j$ that is associated with each dictionary $D_j$. The way in which the subjective score scale is partitioned is an important step since it defines the scores which the model is capable of providing during the operational stage.

As defined above, each class is defined by the training set $EA_j$ of objective measurements, and an interval $I_j$ on the scale of subjective scores $NS_1$.

When performing subjective tests using a discrete scoring scale, the number of representative scores and of corresponding ranges is naturally limited by the number of levels that can be given to the score (in general five levels).

For subjective tests using a continuous scoring scale, the possibilities are much more varied: the number of training sets can be arbitrary. Two approaches are then possible: either subjective score intervals $I_j$ are selected arbitrarily, or else an automatic procedure is applied enabling intervals $I_j$ to be selected.

Arbitrary Partitioning

An arbitrary selection of intervals for subjective scores $NS_i$ (see FIG. 8 for a uniform distribution) has the advantage of requiring no particular resource during the hardware installation of the invention in equipment. Unfortunately, such partitioning which takes no account of the way subjective scores for the sequences of the set E (FIG. 9) are distributed in fact runs the risk of defining certain intervals which contain few or no subjective scores $NS_1$, and a single interval might contain nearly all of the scores.

Such a non-uniform distribution of subjective scores amongst the intervals has two drawbacks for the model:

1) Firstly, whatever the size of the dictionaries and the sensitivity of the parameters $V_{1 \ldots t}$ to degradation, the difference between the predicted subjective score and the real subjective score cannot be minimized. The operational stage associates each vector $V_{i \ldots t}$ of objective parameters with the score $NRS_p$ of the closest dictionary $D_p$. Since the subjective score interval represented by $NRS_p$ has a certain interval width, the mean difference cannot drop below a certain threshold which is a function of the width of the interval. When the corresponding training set $EA_p$ contains the major fraction of the sequences $S_i$, the model will make very frequent use of the score $NSR_p$ and will thus frequently commit a naming error. The mean performance of the model for this class p of scores will thus be limited by said interval width, and will be improved by reducing the interval. Consequently, for the class p corresponding to the major fraction of the sequences $S_i$, it is the mean performance of the model which is limited.

It can thus be seen that it is advantageous to partition using smaller intervals in zones that are dense in terms of the number of subjective scores obtained in the database DBNS.

2) Secondly, an arbitrary approach to positioning can lead to having a non-optimal overall number of vectors for the dictionaries. With this type of partitioning, the training sets $EA_j$ that are formed can be of very different sizes. As a result, for a training set $EA_p$ of large size, the algorithm for the classification stage will need numerous vectors in the dictionary $D_p$ in order to represent $EA_p$ with desired distortion. That is because of the wide diversity of the data to be represented. Partitioning that guarantees that significant unbalance will not be obtained concerning the sizes of the training sets can resolve this point. Furthermore, it is not certain that the smaller sizes of the other training sets will enable the sizes of their dictionaries to be reduced. Overall this leads to an increase in the hardware cost of implementing the method, and to a decrease in the accuracy of the model.

A partial response to this drawback is to perform partitioning empirically, each time a set E of sequences is studied. For this purpose, the scale of scores will be partitioned more finely in those locations where the number of scores $NS_1$ is large.

Figure 9:
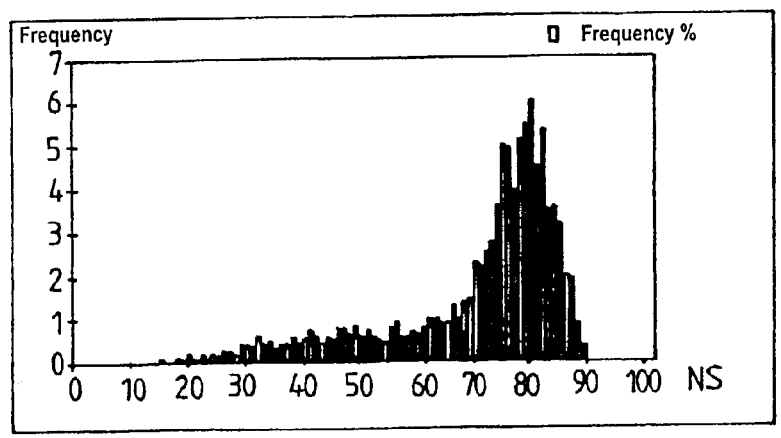
FIG. 9 is an example showing the frequency with which subjective scores $NS_i$ appear.

Nevertheless, it is much more advantageous to apply a procedure that is automatic, and that also enables partitioning to be performed optimally by implementing automatic partitioning that adapts to the statistical distribution of the subjective scores allocated to the set E of sequences $S_i$, Arbitrary partitioning is not a priori well adapted to the way in which the subjective scores $NS_1$ are distributed along the subjective score scale. Although the set E of training sequences is representative of degradations, it is generally found that the distribution of the values of $NS_i$ is far from being uniform, e.g. when applied to digital television. FIG. 9 shows the frequency with which subjective scores $NS_1$ occur: it can be seen that many scores are close to a high level of quality. High quality classes will thus represent the vast majority of scores whereas the lowest quality class will be nearly empty. Using an automatic procedure for optimum partitioning guarantees that this set DBNS of subjective notes is distributed more fairly, thereby making it possible to obtain better performance from the final model.

This problem is advantageously solved by a method comprising two steps: firstly identifying k representative subjective scores $NSR_j$, and then selecting the subjective score $NSR_j$ that best represents the subjective score $NS_i$.

Figure 10:
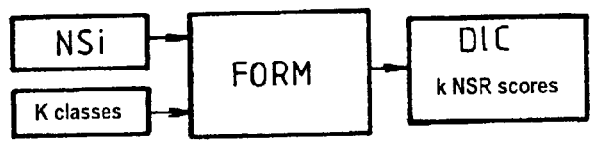
FIG. 10 shows a process for identifying representative subjective scores in accordance with the invention.

1) k representative subjective scores $NSR_j$ are identified on the basis of the subjective scores $NS_1$ (FIG. 10). The method assumes that each score $NS_i$ is a one-dimensional vector, so as to apply a reference dictionary building process. One of the LBG, dynamic swarm, or Kohonen's neural network methods is used in order to obtain the desired number k of representatives $NRS_j$.

This type of method tends to seek out minimum distortion in the sense of minimum distance Δ between the set of $NS_i$ and the set of $NSR_j$. It thus responds perfectly to the drawbacks of arbitrary positioning.

2) The training set DBMO is classified into k sets $EA_j$. For this purpose, data pairs $(MO_1, NS_i)$ are considered, each pair corresponding to a sequence $S_i$. For each pair, the closest representative subjective score $NSR_j$ is found in $NS_1$ by applying the vector quantification procedure, thus enabling the index j to be determined. The objective data vector $MO_1$ is then added to the training set $EA_j$. The creation of sets $EA_j$ amongst which the vectors $MO_i$ are distributed terminates once all of the pairs $(MO_i, NS_1)$ have been processed.

Figure 8:
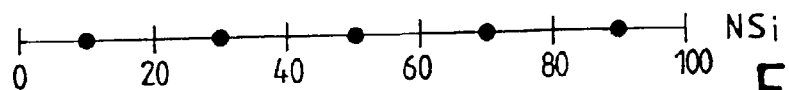
FIG. 8 shows a uniform distribution of subjective score intervals.
Figure 11:
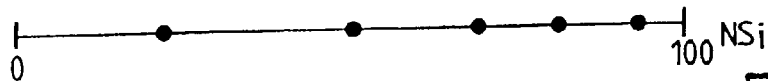
FIG. 11 shows an example of a non-uniform distribution of subjective scores as obtained using the process shown in FIG. 10.

An example of optimal partitioning of the subjective score scale is given in FIG. 11 which illustrates the difference compared with FIG. 8.

The model is used here to illustrate its possibilities on a digital television program containing degradations. The subjective scores were obtained using the SSCQE protocol, i.e. one score every half-second. It is then considered that the program is made up of a series of as many half-second short sequences $S_i$ as there are scores.

Figure 12:
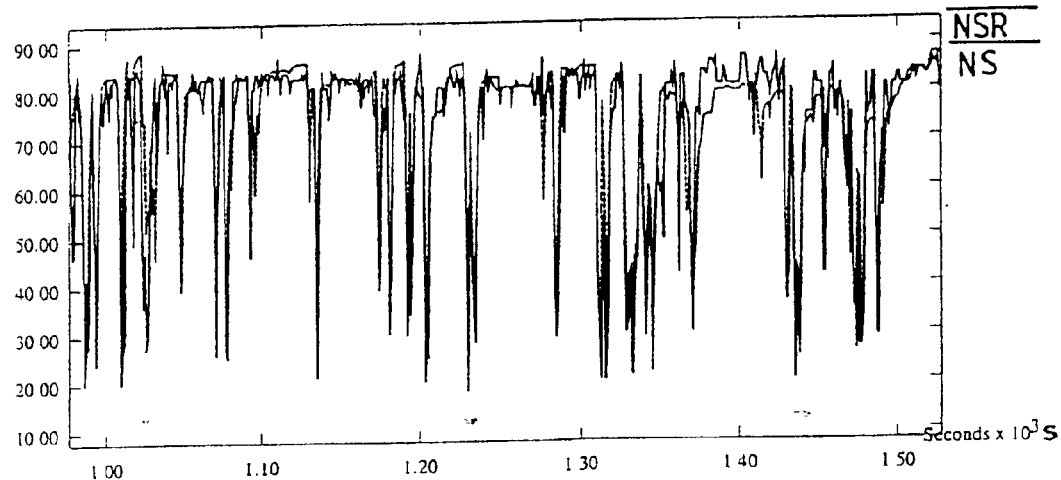
FIGS. 12 and 13 show the precision of evaluation in accordance with the invention.

FIG. 12 shows together how the subjective score NS and the allocated objective score NSR vary over half an hour. It can be seen that the allocated objective score NSR tracks the subjective score NS very closely (dashed line).

Figure 13:
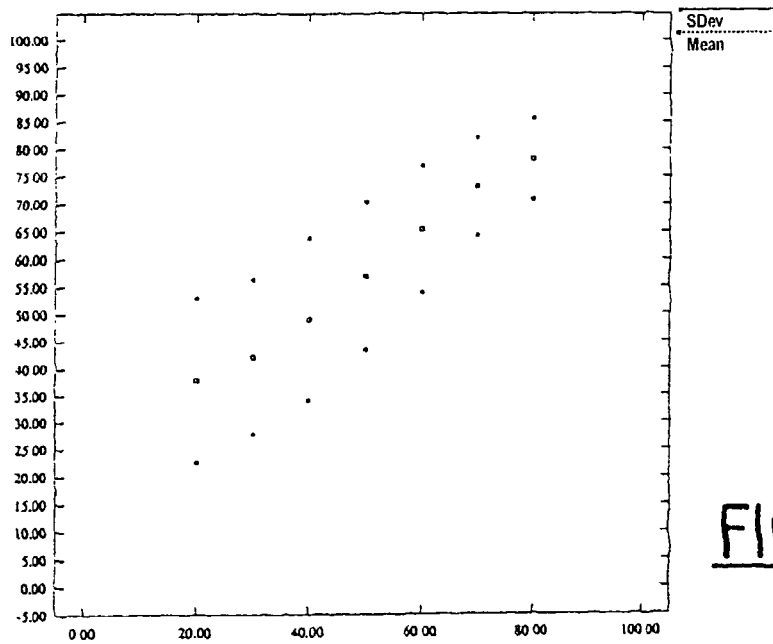

FIG. 13 summarizes correspondence between the score predicted by the model and the real subjective score for the same experiment, together with the accuracy of the model. Seven classes are distinguished, corresponding to as many predicted score values (objective score NS on the abscissa, subjective score NSR on the ordinate).

For each class, the graph shows the mean of the real subjective scores (Mean) given by the observers. Good linearity can be seen in the correspondence between the two scores, thus constituting a first performance criterion.

The mean of the real subjective scores (Mean) is also shown lying between two other scores (SDev). For each class these scores give the amplitude relative to the mean of the standard deviation of the subjective scores corresponding to the objective score of the class. A small value means that the model is accurate. The values obtained for standard deviation are comparable to the performance of the subjective tests which constitute the reference for the model, which is entirely satisfactory.

Figure 14:
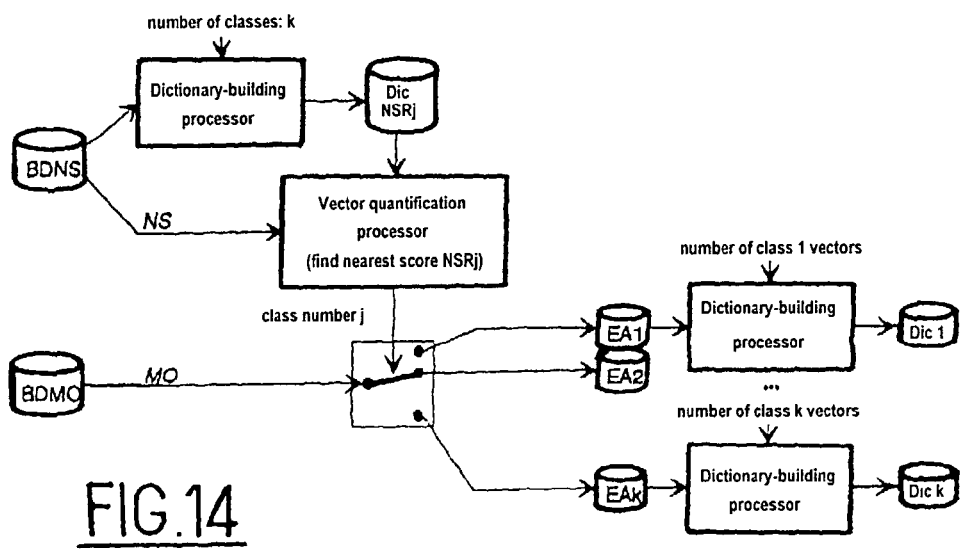
FIGS. 14 and 15 show an implementation of the invention relating respectively to the training stage and to the operational stage.

An implementation of the invention is described below with reference to FIGS. 14 and 15.

Figure 15:
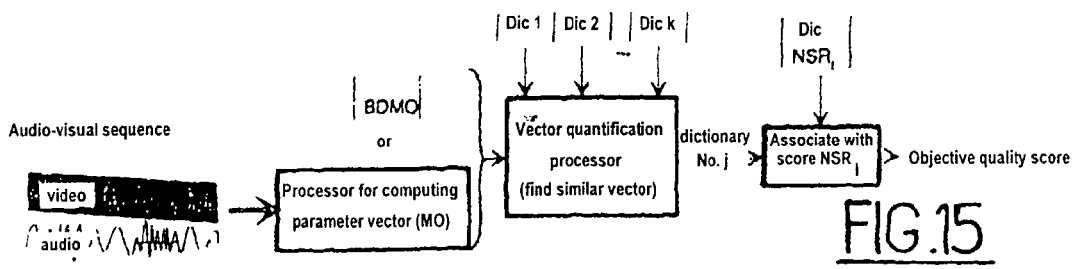

In order to evaluate the quality of audiovisual signals, the method thus implements two stages: a training stage (FIG. 14); and an operational stage (FIG. 15).

The training stage is performed only once. It consists in building k dictionaries $D_j$ of objective measurements, together with the associated representative subjective scores $NSR_j$. This stage is implemented:

firstly from the objective measurement database (BDMO) obtained from audio and/or video signals and a processor (not shown) for computing parameters (MO, objective measurements); and secondly a subjective score database (DBNS) obtained from the same audio and/or video signals as the database DBM0 and a set of observers.

The training stage comprises three steps:

1) A dictionary building processor finds the k subjective scores $NSR_j$ representative of the database BDNS.

2) Each vector of the database BDMO is added to one of the k training sets $EA_j$ as a function of the class j to which the score NS of the database BDNS corresponding to the vector belongs. The class j is obtained using a vector-quantification processor which finds the score $NSR_j$ that is closest to the score NS.

3) Finally, each dictionary $D_j$ (Dic 1, . . . , Dic k) made up of $N_j$ vectors is obtained from the corresponding training set $EA_j$ using a dictionary-building processor.

Thereafter, the operational stage is applied each time the quality of an audiovisual sequence needs to be predicted. This stage makes use of the knowledge acquired by the model during the training stage. For a vector of objective parameters MO coming from an audiovisual sequence, an objective quality score is computed. The objective parameters MO are supplied by a parameter-computing processor which can be of any kind.

This operational stage can thus comprise two steps:

1) A vector-quantification processor finds the vector U which is closest to the input vector of objective parameters MO from amongst all of the vectors of the dictionaries Dj (Dic 1, . . . , Dic k) obtained during the training stage. The processor then provides the number j of the corresponding dictionary.

2) The following step can then allocate the quality score of value $NSR_j$ to the audiovisual sequence.

What is claimed is:

1. A method of evaluating an audiovisual sequence, the method being characterized in that it implements:
a) training, comprising allocating a subjective score $NS_i$ to each of $N_0$ training sequences $S_i$ (where i=1, 2, . . . , $N_0$) presenting degradations identified by a training vector $MO_i$ comprising objective measurements taken from the signals of the audiovisual sequence which is given to each sequence $S_i$ in application of a first vectorizing method, in order to build up a database of $N_0$ training vectors $MO_i$ with corresponding subjective scores $NS_i$;
b) classifying the $N_0$ training vectors $MO_i$ into k classes of scores as a function of the subjective scores $NS_i$ that have been allocated to them, so as to form k training sets $EA_j$ (where j=1, 2, . . . , k) which have k significant training scores $NSR_j$ allocated thereto;
c) for each audiovisual sequence to be evaluated, generating a vector MO using said first vectorization method; and
d) allocating to the audiovisual sequence for evaluation the significant training score $NSR_j$ that corresponds to the training set $EA_j$ containing the vector that is closest to the vector MO in the sense of vector quantification.

2. A method according to claim 1, characterized in that it comprises:

between steps b) and c);

b1) for each training set $EA_j$, using a second vectorization method to generate a reference dictionary $D_j$ made up of $N_j$ reference vectors $VR_i$ (where $I=1, 2, \ldots, N_j$);

and between steps c) and d):

c1) selecting amongst the reference vectors $VR_i$ of the $\underline{k}$ reference dictionaries, the reference vector $VR_e$ which is closest to said vector MO; and in that step d) allocates to the audiovisual sequence for evaluation the significant training score $NSR_j$ corresponding to the reference dictionary containing said closest reference vector $VR_i$.

3. A method according to claim 1 or claim 2, characterized in that the significant training scores $NSR_j$ are distributed in uniform manner along the score scale.

4. A method according to claim 1, characterized in that the significant training scores $NSR_j$ of at least some of the $\underline{k}$ reference dictionaries are distributed in non-uniform manner along the score scale.

5. A method according to claim 4, characterized in that said distribution is such that at least some of the reference dictionaries contain substantially the same numbers of reference vectors.

6. A method according to claim 4 or claim 5, characterized in that it comprises, between step a) and b), identifying $\underline{k}$ significant training scores $NSR_j$ from subjective scores $NS_i$ each considered as a one-dimensional vector, by finding the minimum distance between the set of the $N_0$ subjective scores $NS_i$ and the $\underline{k}$ significant training scores.

* * * * *

UNITED STATES PATENT AND TRADEMARK OFFICE
CERTIFICATE OF CORRECTION

| | | |
|---|---|---|
| PATENT NO. | : 7,107,251 B1 | |
| APPLICATION NO. | : 10/018661 | |
| DATED | : September 12, 2006 | |
| INVENTOR(S) | : Jamal Baina and Pierre Bretillon | |

It is certified that error appears in the above-identified patent and that said Letters Patent is hereby corrected as shown below:

Title page Item (87)
"PCT Pub. Date: Jan. 14, 2001" should read --PCT Pub. Date: Jan. 1, 2001--

Title page Item (57) Abstract:
paragraph (b), "training sets EA" should read --training sets ESj--

Signed and Sealed this

Tenth Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 7,107,251 B1
APPLICATION NO. : 10/018661
DATED : September 12, 2006
INVENTOR(S) : Jamal Baina and Pierre Bretillon It is certified that error appears in the above-identified patent and that said Letters Patent is hereby corrected as shown below:

Title page Item (87)
"PCT Pub. Date: Jan. 14, 2001" should read --PCT Pub. Date: Jan. 1, 2001--

Title page Item (57) Abstract:
paragraph (b), "training sets EA" should read --training sets EAj--

This certificate supersedes Certificate of Correction issued April 10, 2007.

Signed and Sealed this

Tenth Day of July, 2007

JON W. DUDAS
*Director of the United States Patent and Trademark Office*